United States Patent
Lacourcelle

[11] Patent Number: 5,928,530
[45] Date of Patent: Jul. 27, 1999

[54] SPARK EROSION ELECTRODE WIRE STRUCTURE, METHOD OF MANUFACTURING IT, AND APPLICATION TO SPARK EROSION

[75] Inventor: Louis Lacourcelle, Saint Jean de la Blaquiere, France

[73] Assignee: Thermocompact, Societe Anonyme, Metz Tessy, France

[21] Appl. No.: 08/840,189

[22] Filed: Apr. 11, 1997

[30] Foreign Application Priority Data

Apr. 11, 1996 [FR] France ................................. 96 04894

[51] Int. Cl.⁶ ............................... B23H 1/06; B23H 7/08
[52] U.S. Cl. .......................................................... 219/69.12
[58] Field of Search .............................. 219/69.12, 69.15, 219/69.17; 428/632; 148/258

[56] References Cited

U.S. PATENT DOCUMENTS

| | | | |
|---|---|---|---|
| 4,497,876 | 2/1985 | Kidon | 428/632 |
| 4,686,153 | 8/1987 | Tominaga et al. | 219/69.12 |
| 5,118,572 | 6/1992 | DeRobert et al. | 219/69.12 |
| 5,407,749 | 4/1995 | Bishop | 148/258 |

FOREIGN PATENT DOCUMENTS

| | | |
|---|---|---|
| 381595 | 8/1990 | European Pat. Off. . |
| 61-288932 | 12/1986 | Japan . |

OTHER PUBLICATIONS

Patent Abstracts of Japan, vol. 011, No. 157, JP 61288932.
Patent Abstracts of Japan, vol. 011, No. 210, JP 62028123.
Patent Abstracts of Japan, vol. 013, No. 282, JP 01078724.
Database WPI, Section Ch, Week 9225, JP 61279433.

*Primary Examiner*—Geoffrey S. Evans
*Attorney, Agent, or Firm*—Ratner & Prestia

[57] ABSTRACT

A metal or alloy spark erosion electrode wire in accordance with the invention has a surface conversion layer containing chemical compounds of said metal or alloy and at least one polyvalent transition element such as hexavalent chromium. This reduces the risk of the wire breaking in the spark erosion machine, and improves the surface state on the machined part.

11 Claims, 1 Drawing Sheet

SPARK EROSION ELECTRODE WIRE STRUCTURE, METHOD OF MANUFACTURING IT, AND APPLICATION TO SPARK EROSION

BACKGROUND OF THE INVENTION

1. Field of the Invention

The present invention concerns spark erosion electrode wires, which are used to machine electrically conductive material parts in a spark erosion machine.

2. Description of the Prior Art

The spark erosion electrode wire generally comprises a core or at least one intermediate layer of a metal that is a good conductor of electricity, and a surface layer of the same or a different metal or alloy. The electrode wire is moved axially in a sparking area, in which it is guided by entry guides and exit guides. An electrical voltage is applied between the electrode wire and the part to be machined which is itself placed in the sparking area, in order to produce in said sparking area streams of sparks between the wire and the part. The sparks simultaneously wear away the wire and wear away the part. A dielectric liquid occupies the sparking area between the wire and the part. In some spark erosion machines, the liquid is a bath, which is circulated to evacuate waste. In other machines, the liquid is sprayed.

A surface of the required shape is cut into the part by relative displacement of the wire and the part in the radial direction relative to the axis of the wire.

The electrode wires used generally have a small diameter, frequently around 0.2 millimeters, and they must be correctly tensioned in the sparking area to achieve a good accuracy of machining.

A first problem encountered with electrode wire spark erosion machines is the frequent risk of breakage of the wire. Should the wire break, the spark erosion machine is generally adapted for the wire to be rethreaded either automatically or manually. This obviously reduces the efficiency of the machine, and threading of the wire can sometimes be very difficult because of its small diameter, its flexibility, and the small diameter of the wire guides in which it threads.

It is found that the risk of breakage tends to increase as the machining of the parts progresses.

A second problem encountered in spark erosion using electrode wires is that of obtaining a satisfactory surface state. Indeed, spark erosion operates by sparking, that is to say by the erosive action of discontinuous electrical sparks on the part. The discontinuous nature of the sparks produces a surface state on the part that is not always sufficiently regular, depending on the requirements and the applications of the part. To obtain sufficient dimensional accuracy of the machined surface, the machines carry out the machining in a number of steps, with a final finishing step in which very little material is removed from the part. Nevertheless, the roughness coefficient usually obtained on the surface of the part is not always sufficient, and visible striations are observed on the surface of the part. The existing solutions to improve the surface state obtained entail reducing the intensity of the sparking current, and/or reducing the sparking time. However, this significantly reduces the machining rate. In all cases, there is a requirement to improve the surface state and the dimensional precision of the machined parts, and to avoid their deterioration during machining.

Some electrode wires, such as brass wires with a surface layer of zinc, are known to procure a better surface state, compared to a wire with a surface layer of diffused zinc and copper alloy, but machining is then slower and the risks of the wire breaking are increased.

Various electrode wire structures have been proposed, including a surface layer of a transition metal or a metal oxide: in EP-A-0 381 595, there is a surface layer of iron, nickel, cobalt or chromium; in JP-A-01 078724, the surface layer is of manganese; in JP-A-61 279433 and JP-A-61 288932, the surface layer is of chromium oxide; in JP-A-62 028123, the surface layer is of molybdenum oxide or vanadium oxide. None of these structures improves the surface state of the machined part in combination with reducing the risk of the wire breaking and increasing the machining rate.

A problem addressed by the invention is that of designing a new spark erosion electrode wire structure reducing the risk of the wire breaking and improving the surface state of the part machined with said wire, without reducing the machining rate.

SUMMARY OF THE INVENTION

To achieve the above and other objects, the solution in accordance with the invention is to effect a surface structural transformation of the spark erosion electrode wire, by formation of chemical compounds from the surface metal and an appropriate combined polyvalent element from the periodic table of the natural elements.

Accordingly, a spark erosion electrode wire in accordance with the invention, having a metal or alloy peripheral layer, includes a surface conversion layer containing chemical compounds of said metal or alloy and at least one polyvalent transition element selected from groups $IV_A$, $V_A$, $VI_A$ or $VII_A$ of the first, second or third families of the periodic table of the natural elements.

In the surface conversion layer, the metal atoms have lost their metal properties and are bonded by chemical bonds to combined transition element ions.

The polyvalent transition element is advantageously selected from the group of elements comprising Cr, Ti, V, Mn, Nb, Mo, W and Re.

Good results are obtained by providing a conversion layer containing chemical compounds of said metal or alloy and hexavalent chromium. The surface conversion layer can be a light conversion layer such as a white chromate layer, or an iridescent yellow chromate layer. Alternatively, the surface conversion layer can be a thicker layer.

The metal or the alloy forming the peripheral layer of the wire can be selected from the group comprising zinc, copper, aluminum, titanium, tungsten and alloys thereof. The metal or the alloy present at the periphery of the wire can form all of the cross-section of the wire within the surface conversion layer. Alternatively, the metal or the alloy present at the periphery of the wire can form a peripheral layer surrounding a core or another intermediate layer.

Accordingly, the invention applies to wires made of, for example, copper, titanium, tungsten, aluminum and alloys of these metals, with or without a peripheral layer of zinc or zinc alloy, and to steel wires coated with zinc or zinc alloy.

DETAILED DESCRIPTION OF THE INVENTION

Figure 1:
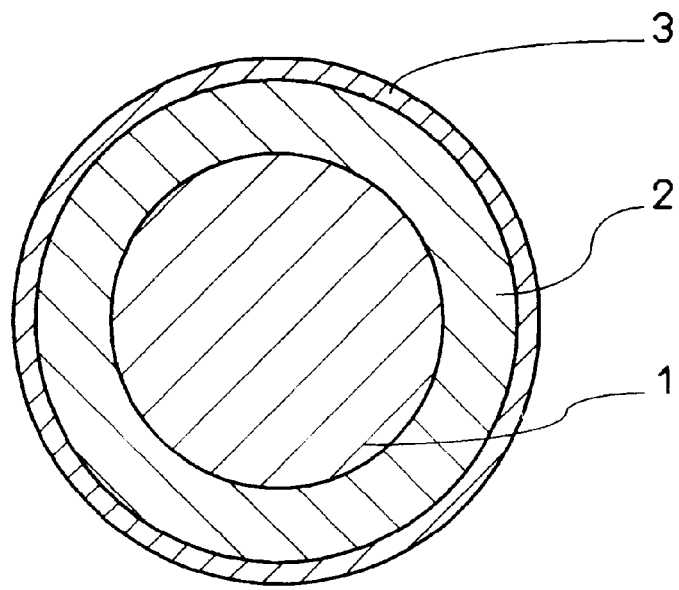

By way of illustration, FIG. 1 shows, in cross-section, an electrode wire of the invention having a core 1 made of a first material which can be steel, aluminum, brass and any other appropriate core material, the core 1 being coated with a peripheral layer 2 of metal or alloy itself coated with a surface conversion layer 3. Note that the thicknesses shown are for illustrative purposes only, and have been enlarged for ease of comprehension.

Figure 2:
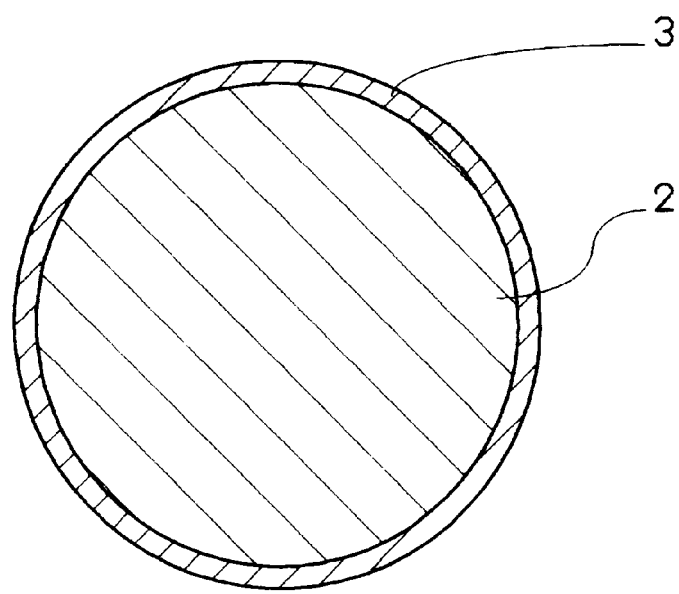

FIG. 2 shows, in cross-section, a variant embodiment of the electrode wire of the invention, in which the peripheral metal or alloy layer 2 coated with the surface conversion layer 3 constitutes all of the internal cross-section of the wire.

One method of manufacturing a wire of this kind with a metal or alloy peripheral layer 2 and a surface conversion layer 3 comprises a final step of bringing the wire into contact with a solution of simple or composite ions of at least one polyvalent transition element from groups $IV_A$, $V_A$, $VI_A$ or $VII_A$ of the first, second or third families of the period table of the natural elements.

During said final step, an electrical current flowing between the solution and the wire may advantageously be superimposed, creating an exchange reaction between the solution and the metal surface of the wire.

The final step of contact with a solution of simple or composite ions may be implemented by immersion, or by spraying. Examples of baths that can be used to form the conversion layer on the spark erosion electrode wire are described hereinafter.

Examples of solutions for forming a light chromate conversion layer on wire with a peripheral layer of zinc or zinc alloy:

| Example 1: | potassium chromate | 1.35 g/l |
| --- | --- | --- |
|  | sodium fluoride | 2.75 g/l |
|  | sodium sulfate (anhydrous) | 0.9 g/l |
|  | nitric acid | 15 ml/l |
| Example 2: | potassium dichromate | 1.28 g/l |
|  | chromic alum (12 H$_2$O) | 0.43 g/l |
|  | sodium fluoride | 2.88 g/l |
|  | sodium sulfate (hydrated) | 0.43 g/l |
|  | nitric acid | 15 ml/l |

Examples of compositions for forming an iridescent yellow chromate conversion layer on wire with a peripheral layer of zinc or zinc alloy:

| Example 3: | chromic acid anhydride | 2 g/l |
| --- | --- | --- |
|  | sodium chloride | 4 g/l |
| Example 4: | chromic acid anhydride | 5.5 g/l |
|  | sodium dichromate (2 H$_2$O) | 5.5 g/l |
|  | sodium sulfate (10 H$_2$O) | 2.2 g/l |
|  | nitric acid (40° B) | 3.6 ml/l |
| Example 5: | chromic acid anhydride | 6.5 g/l |
|  | magnesium sulfate (7 H$_2$O) | 0.8 g/l |
|  | nitric acid | 1.5 ml/l |
|  | acetic acid (glacial) | 1.5 ml/l |

Example of solution for forming a thicker chromate conversion layer on wire with a peripheral layer of zinc or zinc alloy:

| Example 6: | ammonium formate | 50 g/l |
| --- | --- | --- |
|  | chromic acid anhydride | 20 g/l |
|  | nitric acid | 30 ml/l |

Another example of solution for forming a conversion layer containing molybdenum salts on wire having a peripheral layer of zinc or zinc alloy:

| Example 7: | ammonium molybdate | 20 g/l |
| --- | --- | --- |
|  | nickel sulfate | 40 g/l |
|  | boric acid | 20 g/l |

Example of solution for forming a chromate conversion layer on copper or copper alloy wire:

| Example 8: | sodium dichromate | 75 g/l |
| --- | --- | --- |
|  | sodium nitrate | 2 g/l |
|  | diammonium phosphate | 1 g/l |

The person skilled in the art can obtain commercially available formulations to realize a conversion layer on metals other than zinc, copper or alloys thereof.

Using the invention, it may prove sufficient to provide a conversion layer such as a light chromate layer or an iridescent yellow chromate layer, using the solutions of examples 1 through 5 hereinabove.

A spark erosion process using a wire with a surface conversion layer is found to be subject to reduced risks of breakage of the wire in the spark erosion machine, and produces a more regular surface state on the part to be machined. The risks of the wire breaking are reduced in particular at the location of the entry guides into the machining area.

The surface state and the dimensional precision of the machined parts are also found to remain within satisfactory tolerances even after a long machining time, and at the same time there is less wear of the spark erosion machine entry and exit guides in the spark erosion machine.

The present invention is not limited to the embodiments explicitly described, but encompasses the various variants and generalizations thereof within the scope of the following claims.

There is claimed:

1. A spark erosion electrode wire for reducing the risk of wire breakage and improving the surface state of a part machined thereby, comprising:

a metal or alloy peripheral layer; and a surface conversion layer comprising chemical compounds of (a) said metal or alloy of said peripheral layer and (b) at least one polyvalent transition element selected from groups $IV_A$, $V_A$, $VI_A$ or $VII_A$ of the first, second or third families of the periodic table of the natural elements.

2. The electrode wire claimed in claim 1, wherein said polyvalent transition element is selected from the group of elements consisting of Cr, Ti, V, Mn, Nb, Mo, W and Re.

3. The electrode wire claimed in claim 1, wherein said surface conversion layer comprises chemical compounds of said metal or alloy and hexavalent chromium.

4. The electrode wire claimed in claim 3, wherein said surface conversion layer is a light or iridescent yellow chromate layer.

5. The electrode wire claimed in claim 1, wherein said metal or alloy of said peripheral layer is selected from the group consisting of zinc, copper, aluminum, titanium, tungsten and alloys thereof.

6. The electrode wire claimed in claim 1, wherein said metal or alloy of said peripheral layer forms all of the cross-section of said wire within said surface conversion layer.

7. The electrode wire claimed in claim 1, wherein said metal or alloy peripheral layer is formed around a core or another intermediate layer.

8. The electrode wire claimed in claim 1, wherein atoms of said metal or alloy in said surface conversion layer have lost their metal properties and are bonded by chemical bonds to ions of said polyvalent transition element.

9. A spark erosion process using a spark erosion wire as claimed in claim 1.

10. A method of manufacturing a spark erosion electrode wire having a metal or alloy peripheral layer for reducing the risk of wire breakage and improving the surface state of a part machined thereby, including a final step of bringing said wire into contact with a solution of simple or composite ions of at least one polyvalent transition element selected from groups $IV_A$, $V_A$, $VI_A$ or $VII_A$ of the first, second or third families of the periodic table of the natural elements, and forming chemical compounds of said metal or alloy of said peripheral layer and said polyvalent transition element, to form a surface conversion layer on said wire.

11. The method claimed in claim 10, wherein, during said final step, an electrical current flowing between said solution and said wire is superimposed, creating an exchange reaction between said solution and said peripheral layer of said wire.

* * * * *